United States Patent
Polozoff

(10) Patent No.: US 7,996,542 B2
(45) Date of Patent: *Aug. 9, 2011

(54) SYSTEMS AND MEDIA FOR SHARING SESSION DATA ON A NETWORK

(75) Inventor: Alexandre Polozoff, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/329,060

(22) Filed: Dec. 5, 2008

(65) Prior Publication Data

US 2009/0089437 A1    Apr. 2, 2009

Related U.S. Application Data

(63) Continuation of application No. 10/955,180, filed on Sep. 30, 2004, now Pat. No. 7,552,219.

(51) Int. Cl.
*G06F 15/16* (2006.01)
*G06F 15/173* (2006.01)

(52) U.S. Cl. .................... 709/227; 709/223

(58) Field of Classification Search .............. 709/227
See application file for complete search history.

(56) References Cited

U.S. PATENT DOCUMENTS

| | | | |
|---|---|---|---|
| 6,574,736 B1 | 6/2003 | Andrews | |
| 6,654,794 B1 | 11/2003 | French | |
| 6,714,962 B1 | 3/2004 | Helland et al. | |
| 7,093,230 B2 | 8/2006 | E et al. | |
| 7,315,826 B1 | 1/2008 | Guheen et al. | |
| 7,352,803 B2 | 4/2008 | Bremer et al. | |
| 7,716,347 B2 * | 5/2010 | Chan et al. | 709/228 |
| 7,765,304 B2 * | 7/2010 | Davis et al. | 709/227 |
| 2003/0005181 A1 | 1/2003 | Bau, III et al. | |
| 2003/0023957 A1 | 1/2003 | Bau, III et al. | |
| 2003/0167331 A1 | 9/2003 | Kumar et al. | |
| 2003/0167332 A1 | 9/2003 | Kumar et al. | |
| 2003/0167333 A1 | 9/2003 | Kumar et al. | |
| 2004/0006623 A1 | 1/2004 | Gourrand et al. | |
| 2004/0019679 A1 * | 1/2004 | E et al. | 709/226 |
| 2004/0019892 A1 | 1/2004 | E et al. | |

(Continued)

OTHER PUBLICATIONS

Hadjiefthymiades, S., et al., "State Management in WWW Database Applications," Compsac '98, Los Alamitos, CA, U.S.A., 1998, pp. 442-448.

(Continued)

*Primary Examiner* — Jeffrey Pwu
*Assistant Examiner* — Shaq Taha
(74) *Attorney, Agent, or Firm* — Stephen J. Walder, Jr.; Matthew B. Talpis

(57) ABSTRACT

Systems and media for sharing session data on a network are disclosed. More particularly, hardware and/or software for sharing user session data between different servers on a network are disclosed. Embodiments include a data processing system for sharing session data on a network, where the network includes an application server and an enterprise server, each providing at least part of an application to a user on the network. In some embodiments, the application server includes a session transport component for recording changes to user session data with the application server and the enterprise server includes a session transport component for requesting updated user session data from the application server. In further embodiments, the enterprise server may establish a user session based on the updated user session data received from the application server.

15 Claims, 10 Drawing Sheets

U.S. PATENT DOCUMENTS

2004/0093419 A1   5/2004   Weihl et al.
2008/0005273 A1   1/2008   Agarwalla et al.

OTHER PUBLICATIONS

Chen, H., et al., "Session-Based Overload Control in QoS-Aware Web Servers," IEEE Infocom 2002, Conference on Computer Communications, Pt. vol. 2, Piscataway, NJ, U.S.A., 2002, pp. 516-524.

Uehara, S., et al., "Design of a New Mechanism for Context Data Storage on Web Systems and its Implementation Using Component-Object Technology," Systems and Computers in Japan, vol. 34, No. 3, Mar. 2003 (Abstract).

Anido-Rifon, L., et al., "A Component Model for Standardized Web-Based Education," ACM Journal of Educational Resources in Computing, vol. 1, No. 2, Summer 2001, Article #1, 10 pages.

Anido-Rifon, L., et al., "A Component Model for Standardized Web-Based Education," WWW10, May 1-5, 2001, Hong Kong, pp. 86-95.

Wang, W., et al., "Flexible Coordination with Cooperative Hypermedia," HyperText 98, Pittsburgh, PA, U.S.A., 1998, pp. 245-255.

Cuomo, G., et al., "Developing EdgeComputing Applications," IBM & Akamai, Jun. 9, 2003, pp. 1-39.

* cited by examiner

SYSTEMS AND MEDIA FOR SHARING SESSION DATA ON A NETWORK

CROSS-REFERENCES TO RELATED APPLICATION(S)

Pursuant to 35 USC §120, this continuation application claims priority to and benefit of U.S. patent application Ser. No. 10/955,180, entitled "SYSTEMS, METHODS, AND MEDIA FOR SHARING SESSION DATA ON A NETWORK", filed on Sep. 30, 2004, the disclosure of which is incorporated herein in its entirety for all purposes.

BACKGROUND OF THE INVENTION

The present invention is in the field of computer systems. More particularly, the present invention relates to systems and media for sharing session data on a network, particularly for managing user sessions with different servers on a network.

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter. One of the distinguishing characteristics of these systems is the use of a motherboard or system planar to electrically connect these components together. Examples of such personal computer systems are International Business Machine Corporation's (IBM's®) PC 300, ThinkCentre, ThinkPad, Aptiva, and IntelliStation series of personal computers.

The widespread use of PCs in various segments of society has resulted in a reliance on PCs both at work and at home, such as for telecommuting, news, stock market information and trading, banking, shopping, shipping, communication in the form of hypertext transfer protocol (http) and email, as well as other services. PCs are often connected to a network such as the Internet to perform these tasks and access those services. Users gain access to the Internet by accessing a web server via personal Internet service providers (ISP's), broadband network connections, or high speed network connections through office systems. Typically, a user will view Internet or intranet content using a graphical browser application such as Microsoft Corporation's Internet Explorer, Netscape Communication Corporation's Navigator, Mozilla, Apple Corporation's Safari, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display.

For traditional web applications, a single session is established for a user each time the user logs into the web server. Unlike desktop computers, a web server often handles many users simultaneously. A session management mechanism at the web server allows maintaining most of each user's state information (i.e., session information) at the web server while only passing necessary information (for instance, the session identifier) back to the user via cookies, Uniform Resource Locator (URL) rewriting, a Hypertext Markup Language (HTML) hidden field, etc.

The connectivity of PCs has facilitated unprecedented amounts of communication over the Internet, as more and more individuals gain access to them and an increasing number of services have become available, and such usage is expected to continue to increase. Moreover, many content providers are adding more sophisticated features such as high-resolution images, video, shopping carts, etc. As usage of the Internet has grown, it has experienced slowdowns because of the increased demands. Even though new capacity continues to be added, the demands on that capacity also continue to increase. In addition, even though the cost of network access has decreased, reduction in network traffic still can save on costs. These problems have a particular impact on e-commerce websites that often serve thousands of users across the world and require significant network traffic for each user.

Distributed computing over the Internet is one solution that has been developed to help alleviate this problem. A distributed computing system may split processing tasks among multiple servers, placing high volume, less critical applications on application servers near the user and lower volume, more critical applications on a centralized enterprise server or group of servers. For example, an e-commerce site may locate applications such as a catalog or a user's shopping cart on an application server near the user while functions such as checking-out (and purchasing items with a credit card) are performed on a central enterprise server. This allows the processing burden to be split and optimized over a large number of servers (with some closer to the user, and thus often quicker to respond) while preventing bottlenecks at the enterprise server. One provider of distributed Internet processing is Akamai Technologies, Inc.'s Akamai® EdgeComputing$^{SM}$ system which allows user interface applications to be deployed on servers on the "edge", or near the user, while communicating back to the enterprise server via Web service calls. IBM's® WebSphere® Application Server Internet infrastructure software and development tools facilitate network and application deployment. Sun Microsystems, Inc.'s Java™ 2 Enterprise Edition (J2EE) may be used to provide a standard for developing component-based multi-tier enterprise applications to be used in the distributed Internet computing environment.

One common problem with distributed Internet computing environments involves managing user sessions over the multiple servers. Session data in the form of the HttpSession object of the Java Servlet Application Program Interface (API) cannot easily be shared between edge and enterprise environments, resulting in network inefficiencies in handling user requests and information. For example, when a user is an edge application server with a session for their shopping cart and desires to check out, a function often reserved for a central enterprise server, there is no easy mechanism for sharing session information. One solution to this problem is to manually code the sharing of session information into the application, but this requires advance knowledge that sharing is required, it must be maintained, and is susceptible to getting out of synchronization if not done properly. Moreover, this solution does not provide container managed capabilities inherent in J2EE.

There is, therefore, a need for an easy and effective mechanism for managing user sessions on a network over multiple servers, particular for distributed processing of applications on a network. There is an even greater need for such a system when the application is split among a central server and distributed servers.

BRIEF SUMMARY OF THE INVENTION

The problems identified above are in large part addressed by systems, methods and media for sharing session data on a network. One embodiment provides a system for sharing session data on a network. The session data sharing system may generally include an application server for providing at least part of an application to a user on the network, where the user has an established session on the application server with associated session data. The session data sharing system also generally includes a session transport component of the application server for recording changes to the session data of the user session. The session data sharing system also generally includes an enterprise server in communication with the application server for providing at least part of the application to the user, including a session transport component for requesting updated user session data from the application server. Further embodiments include an HttpSession component located on the application server for determining which methods will modify session data and an HttpSession component located on the enterprise server for determining which methods will modify the session data and which methods will require updated session data.

Another embodiment provides a machine-accessible medium containing instructions effective, when executing in a data processing system, to cause the system to perform a series of operations for synchronizing a database on a network. The series of operations generally includes determining that updated session data will be needed by a method of the enterprise server and requesting new session data from the application server. The series of operations also generally includes receiving a request for updated session data and transmitting any updated session data to the enterprise server. The series of operations further may include creating a local session at the enterprise server based on the updated session data. Further embodiments also may include identifying a network address for the application server and forcing session data retrieval from the application server. An additional embodiment provides for determining that session data has been modified at the enterprise server and transmitting an indication of the modified session data from the enterprise server to the application server.

DETAILED DESCRIPTION OF THE INVENTION

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems and media for sharing session data on a network are disclosed. More particularly, hardware and/or software for sharing user session data between different servers on a network are disclosed. Embodiments include a data processing system for sharing session data on a network, where the network includes an application server and an enterprise server, each providing at least part of an application to a user on the network. In some embodiments, the application server includes a session transport component for recording changes to user session data with the application server and the enterprise server includes a session transport component for requesting updated user session data from the application server. In further embodiments, the enterprise server may establish a user session based on the updated user session data received from the application server.

The disclosed embodiments provide a methodology and system whereby session data may be shared between servers on a network, particularly between application servers such as edge application servers and enterprise servers. When a method of the enterprise server needs updated session data, a mechanism is provided to retrieve updated session data from the application server. This automates and streamlines the process of getting session data from an application server to an enterprise server. When a method of the enterprise server modifies the session data for a user, a mechanism is provided to transmit a notification of the updated session to the application server, reducing the probability of conflicts in session data. By providing an easy and automated process of synchronizing session data between application and enterprise servers, a user's experience is improved and network traffic is reduced.

While specific embodiments will be described below with reference to particular configurations of hardware and/or software, those of skill in the art will realize that embodiments of the present invention may advantageously be implemented with other substantially equivalent hardware and/or software systems.

Figure 1:
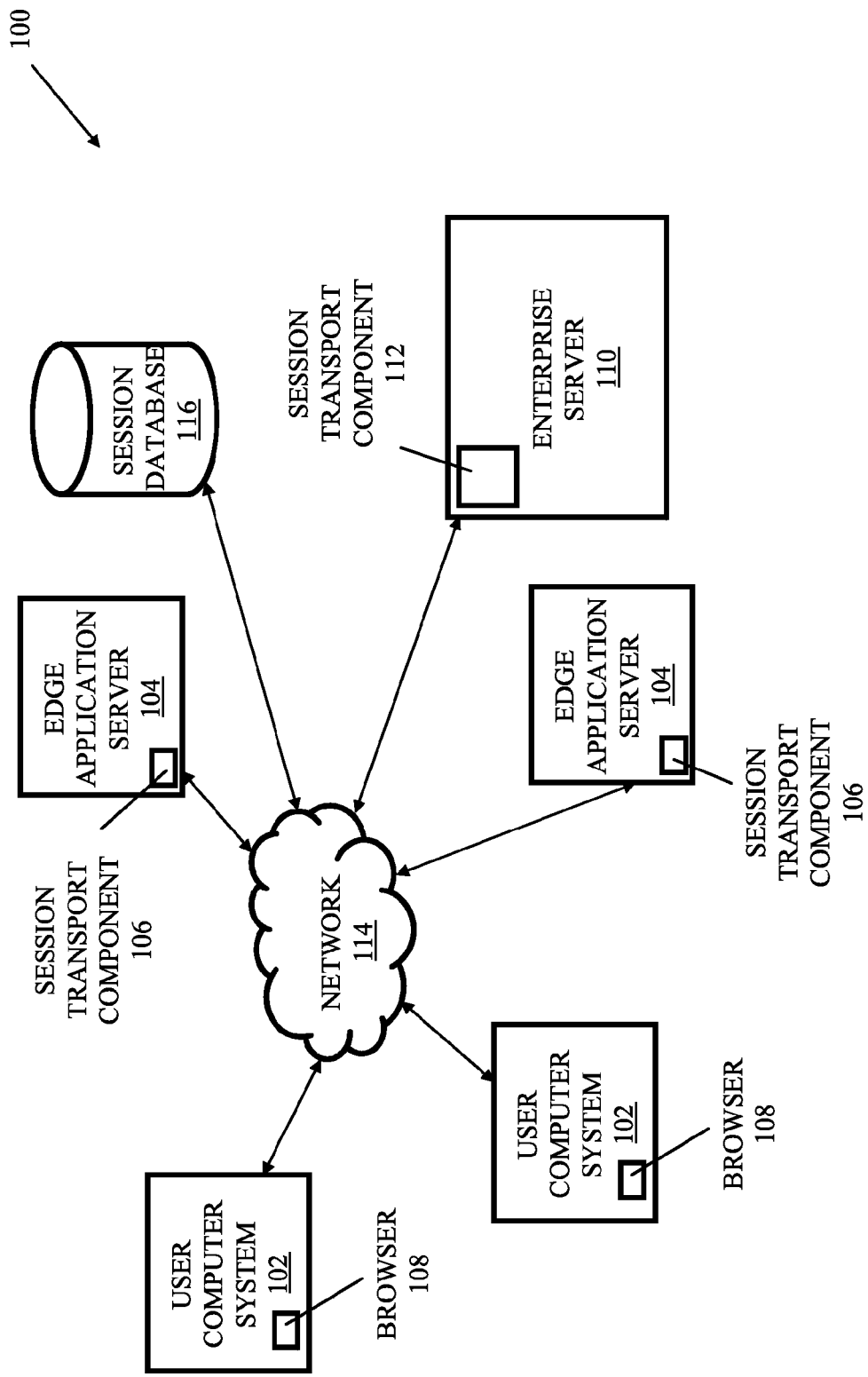
FIG. 1 depicts an environment for a system for sharing user session data over a network according to one embodiment.

Turning now to the drawings, FIG. 1 depicts an environment for a system for sharing user session data over a network according to one embodiment. In the depicted embodiment, session data sharing system 100 includes one or more user computer systems 102 in communication with a network 114. Each user computer system 102 may include a browser 108 to allow a user of the user computer system 102 to access and view information on various network sites. Each user computer system 102 may be in communication with one or more edge application servers 104 via network 114. Each edge application server 104 may host part or all of an application on which a user has a session. Each edge application server 104 may include a session transport component 106 for facilitating communication of session data between the edge application server 104 and the enterprise server 110. The session data sharing system 100 also includes, in the depicted embodiment, an enterprise server 110 and a session database 116, both in communication with network 114. The enterprise server 110 also be in communication with user computer system 102 via network 114 and may host all or part of an application on which a user has a session. The enterprise server 110 may serve as a central aspect of a particular network application such as hosting a network site (i.e., website). For example, a particular network application (such as an e-commerce website) may have many core functions hosted on the enterprise server 110 while many other functions (e.g., user display, shopping cart, catalog, etc.) may be hosted on edge application servers 104 geographically closer to the user computer system 102. Enterprise server 110 may include a session transport component 112 for facilitating communication of session data with the edge application servers 104. Optional session database 116 may be in communication with edge application servers 104 via network 114 for storage of user session information in the event of server failure, change-out, etc.

In session data sharing system 100, any of the user computer systems 102, the edge application servers 104, the enterprise server 110, or the session database 116 may be located at the same location, such as in the same building or computer lab, or could be remote. While the term "remote" is used with reference to the distance between the components of session data sharing system 100, the term is used in the sense of indicating separation of some sort, rather than in the sense of indicating a large physical distance between the systems. For example, any of the components of session data sharing system 100 may be physically adjacent or located as part of the same computer system in some network arrangements. In one embodiment, the user computer systems 102 may be spread across the country or world being served by an enterprise server 110, with edge application servers 104 located remote from the enterprise server 110 and closer to the user computer systems 102 to assist in handling user sessions with those user computer systems 102.

A user may utilize a user computer system 102 and its associated browser 108 to facilitate the access and viewing of content from a network site. User computer systems 102 may include personal computers, workstations, servers, mainframe computers, notebook or laptop computers, tablet PCs, desktop computers, portable computer systems, PDAs, set-top boxes, mobile phones, wireless devices, or the like. Browser 108 may be a graphical browser application that allows a user to view Internet or intranet content such as Microsoft Corporation's Internet Explorer, Netscape Communication Corporation's Navigator, Mozilla, Apple Corporation's Safari, etc. Using a browser 108, a user may connect to a given network site, download content from that site, and view that content. To view additional content (i.e., content from an edge application server 104 or enterprise server 110), the user may designate a new network address (such as by selecting a link on the network site) whose contents then replace the previously displayed information on the user's browser 108.

When a user on a user computer system 102 accesses a network site (via either the edge application server 104 or enterprise server 110), the server may establish a session when the user logs in. Optional user identification and authentication information (e.g., user identification and password) may be required. Login information, user preferences, or any information about the session may be stored as a cookie on the user computer system 102 so that information and preferences do not need to be reentered each time the user accesses the portal and to reduce network traffic. Session day or information may also be stored in the form of Uniform Resource Locator (URL) rewriting, hidden HTTP fields, or other mechanism. When the user has a cookie on their user computer system 102, the server with which they are communicating accesses this cookie and adjusts the information or content sent to the user for display.

Network 114 may be one or more of any type of data communications channel, such as the Internet, an intranet, a LAN, a WAN, an Ethernet network, wireless networks, etc. The Internet or other public network may be particularly useful as network 114 so that the components of the session data sharing system 100 may be widely distributed. Those skilled in the art will recognize, however, that the invention described herein may be implemented utilizing any type of data communications channel.

The edge application servers 104 may serve as an application server for a user on a user computer system 102 providing some or all of the content of a network site. A user may have a user session on an edge application server 104 to store data relating to their interaction with the network site. Each edge application server 104 may be one or more of any type of computer system, including servers, personal computers, workstations, mainframe computers, notebook or laptop computer, desktop computers, or the like. In one embodiment, an edge application server 104 is an IBM® eServer or similar server and may include software such as IBM®'s WebSphere® Edge Server for Multiplatforms (Edge Server), which provides distributed application processing to the edge of the network under centralized administrative and application control. This type of software may help shift the burden of serving personalized, dynamic content from an enterprise server 110 to edge application servers 104 located nearer the "edge" of the network (in other words, closer to the users). This type of software may also allow an edge application server 104 to cache and invalidate dynamic content including Java™ Server Pages (JSPs), components, and servlets, whether the content was generated at the edge application server 104 or the enterprise server 110.

Each edge application server 104 may include a session transport component 106. A session transport component 106 may be any type of application that facilitates communication, including transmitting and receiving, between different computer systems (e.g., servers). One example session transport component 106 may be a Java™ SessionTransport method. The session transport component 106 of the edge application server 104 may transmit and/or receive session data between the edge application server 104 and the enterprise server 110. The session transport component 106 of the edge application server 104 may also be used to record changes to session data, timestamps for changes to session data, indications of requests for updated session data, etc. in a table such as that described in more detail in relation to FIG. 10.

The enterprise server 110 may also serve as application server for a user on a user computer system 102. An enterprise server 110 may establish a user session with a user to store data relating to their interaction with the network site. Each enterprise server 110 may be one or more of any type of computer system, including servers, personal computers, workstations, mainframe computers, notebook or laptop computer, desktop computers, or the like. In one embodiment, enterprise server 110 is an IBM® eServer or similar server. The enterprise server 110 may include software such as IBM®'s WebSphere® Application Server to provide an application server for deployment of enterprise Web services, which may use a Java™ 2 Enterprise Edition (J2EE™) and Web services technology-based application platform. In combination with the edge application servers 104, applications historically run on the enterprise server 110 may now execute in whole or in part on edge application servers 104 to take advantage of distributed application processing and proximity of local edge application servers 104 to users.

The enterprise server 110 may include a session transport component 112. The session transport component 112 of the enterprise server 110 may be similar to session transport component 106 in one embodiment. Session transport component 112 may transmit and/or receive session data between the edge application server 104 and the enterprise server 110. In one embodiment, session transport component 112 may be a Java™ SessionTransport method.

Session database 116 may be in communication with the edge application servers 104 and/or enterprise servers 110 via network 114 to provide for a database for storing user session data. Saved user session data may be used to restore user sessions in the event of failure of one of the edge application servers 104 and/or enterprise servers 110.

The disclosed embodiments of the session data sharing system 100 provide an improved methodology for sharing session data between different servers on a network, such as the edge application servers 104 and the enterprise server 110. In one embodiment, when the enterprise server 110 determines that it needs updated session data it may request such data from the appropriate edge application server 104 (utilizing session transport components 112, 106, respectively). This may occur, for example, when a user of an e-commerce site desires to check-out, as the enterprise server 110 will need the latest version of the user's shopping cart (which likely part of an edge application server 104 session) to proceed. The edge application server 104 may then determine whether any new user session data exists and transmit to the enterprise server 110. The enterprise server 110 in this embodiment may then establish a user session using its existing session data, if any, and the new session data received from the edge application server 104. Similarly, if the enterprise server 110 modifies any session data, the new session data may be pushed out to the edge application server 104 so that it also has the most recent session data. Current solutions do not allow any sharing of session data between the edge application server 104 and the enterprise server 110 without rewriting the application, requiring instead that entire pages be transmitted between them, at best. The methodology of the disclosed embodiments allows session data to be automatically and easily maintained among the various servers as the user's session moves between the servers, while also reducing the amount of network traffic required to provide information to the enterprise server 110.

Figure 2:
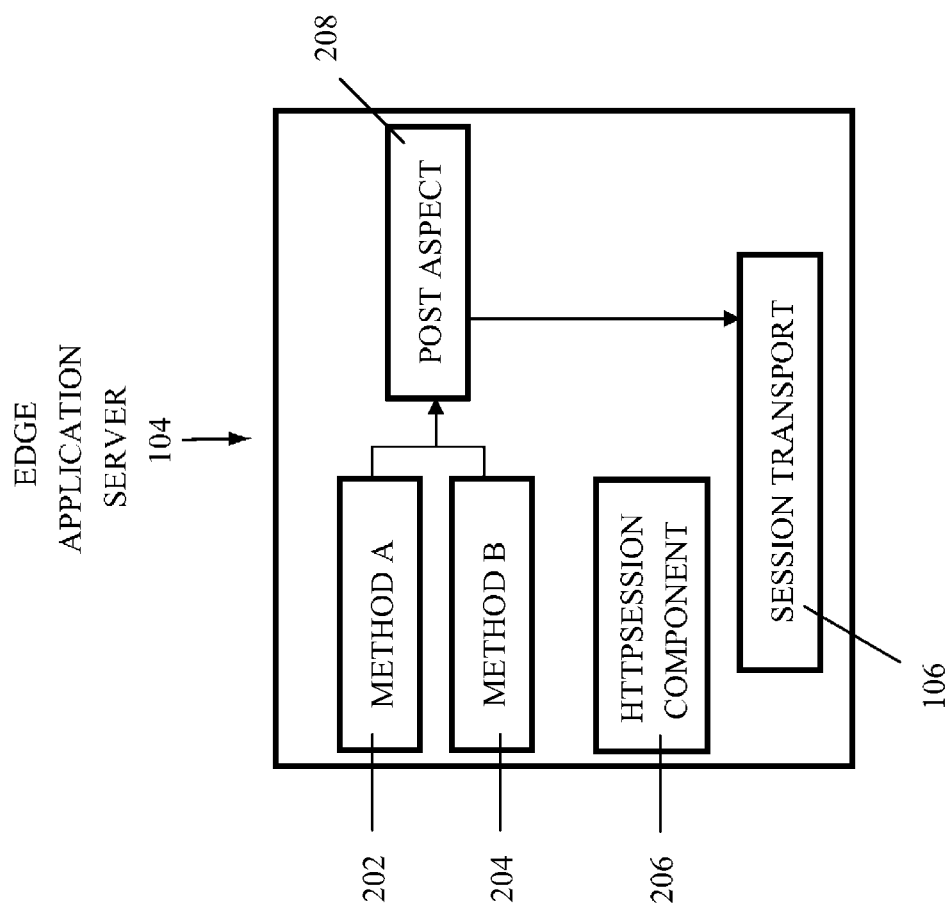
FIG. 2 depicts an edge application server of the session data sharing system of FIG. 1 where session data is modified according to one embodiment.

FIG. 2 depicts an edge application server 104 of the session data sharing system 100 of FIG. 1 where session data is modified according to one embodiment. The edge application server 104 of the depicted embodiment includes one or methods 202, 204, a HttpSession component 206, a post aspect component 208, and a session transport component 106. The HttpSession component 206 may, in one embodiment, identify methods that modify HttpSession data or other session data by reading the code and automatically instrumenting any methods that reference the HttpSession object. Methods 202, 204 may be any individual methods in Java™ that perform some sort of task or function. Any methods 202, 204 that reference the HttpSession object will be instrumented by the HttpSession component 206. The HttpSession interface in Java™ may be implemented by services to provide an association between an HTTP client and HTTP server. This association, or session, persists over multiple connections and/or requests during a given time period. Sessions are used to maintain state and user identity across multiple page requests. User sessions may maintain state and user identity across multiple servers in the event that session data (including HttpSession data) is shared. Session data (or HttpSession data) may include standard session properties, such as identifier for the session, and the context for the session, as well as application layer data. Sessions and session data provide a way to identify a user across more than one page request or visit to a Web site and to store information about that user.

The post aspect component 208 may be created by the HttpSession component 206 as a modification to the code, using aspect-oriented programming (AOP) principles, of methods 202, 204 identifies as modifying session data. AOP is a new programming methodology enabling the modularization of crosscutting concerns through the use of aspects. Crosscutting concerns are aspects of code that cross over multiple functional components. AOP languages such as AspectJ from Xerox Palo Alto Research Center (PARC) simplify working with aspects by supporting explicit mechanisms for programming crosscutting modularities and structuring code. AspectJ is an AOP language that provides an extension to Java™. AOP may be seen as a complementary design and implementation technique to object-oriented programming (OOP). The process of complementing object functionality in AOP may be carried out by an aspect mechanism that observes and reacts to certain events that happen in objects, such as the reception of a message or the catching of an exception. Modification of HttpSession data is another event that may be observed and reacted to by an AOP aspect. An aspect language processor may be responsible for implementing the mechanism through weaving, a systematic process of combining aspects and objects, and can be done with an interpreter, a compiler or a pre-processor. For example, the AspectJ system may be implemented as a preprocessor which generates Java files where code relating to aspects is automatically woven into the code relating to application classes. AOP allows one to set up replacement and/or pre/post actions (e.g., call this logging procedure, use this cached variable, etc.) whenever a particular variable is accessed or modified or whenever the call stack matches a particular pattern.

In the depicted embodiment, post aspect component 208 may be created as a "post" action to methods 202, 204 that executes after the methods 202, 204 execute. The post aspect component 208 may be created by the HttpSession component 206 when it reviews methods to determine which change HttpSession data and weaves the appropriate code into those methods to create the post aspect component 208. The appropriate code may be weaved whenever the method is called. The post aspect component 208 may transmit an indication of any changes to the HttpSession data made by methods 202, 204 to the session transport component 106 for recording (and eventual transmission to the enterprise server 110).

Figure 3:
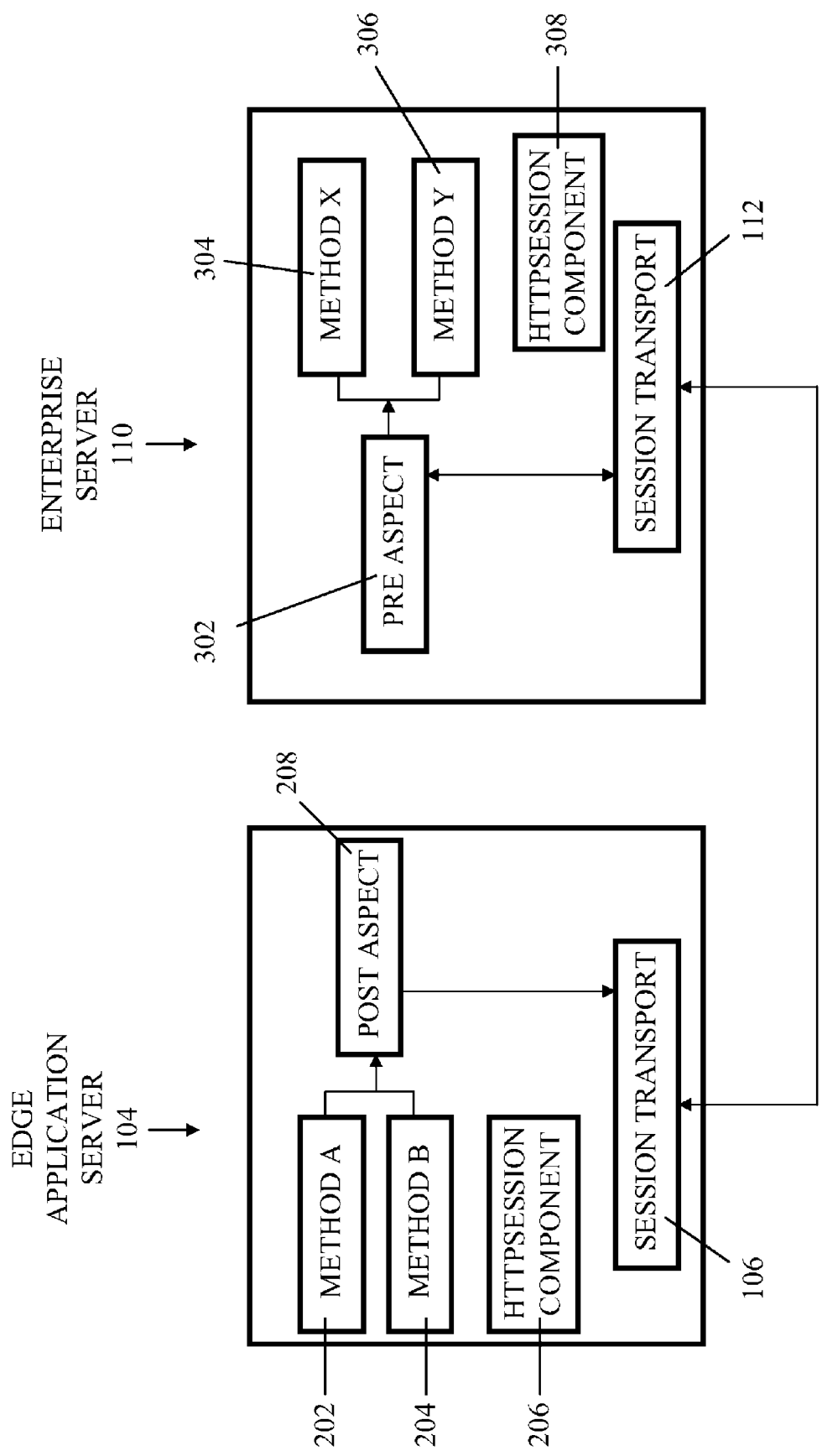
FIG. 3 depicts an edge application server and an enterprise server of the session data sharing system of FIG. 1 where changes to session data are transmitted to the enterprise server according to one embodiment.

FIG. 3 depicts an edge application server 104 and an enterprise server 110 of the session data sharing system 100 of FIG. 1 where changes to session data are transmitted to the enterprise server 110 according to one embodiment. The edge application server 104 may be substantially similar to that of FIG. 2 and the discussion thereof will not be repeated here in the sake of brevity. The enterprise server 110 of the depicted embodiment includes a pre aspect component 302, one or methods 304, 306, a HttpSession component 308, and a session transport component 112. Similarly to HttpSession component 206, HttpSession component 308 may identify methods that modify HttpSession data by reading the code and automatically instrumenting any methods that reference the HttpSession object. Methods 304, 306 may be any individual methods in Java™ that perform some sort of task or function. Any methods 304, 306 that reference the HttpSession object may be instrumented by the HttpSession component 308.

The pre aspect component 302 may be created by the HttpSession component 308 as a modification to the code of methods 304, 306 identified as requiring session data (and thus updated session data) by the HttpSession component 308. In the depicted embodiment, the pre aspect component 302 may be created as a "pre" action to methods 304, 306 that executes before the methods 304, 306 execute. The pre aspect component 302 may request updated HttpSession data from the session transport component 112, which then requests updated HttpSession data from the edge application server 104, in one embodiment. By requesting updated HttpSession data before methods 304, 306 of the enterprise server 110 execute, the most recent user session data may be used by the enterprise server 110 by methods 304, 306. The session transport component 112 may facilitate transmission of the request for updated session data to the edge application server 104 and receipt of updated session data from the edge application server 104. In one embodiment, the HTTP data (e.g., the IP address) may be stripped from the HTTP headers of the user request to identify the edge instance (i.e., the edge application server 104) with which the user has been communicating so that the proper edge application server 104 may be contacted by session transport component 112. Once session transport component 112 receives updated user session data, session transport component 112 establishes a session local to enterprise server 110 for the user to be used by methods 304, 306.

Figure 4:
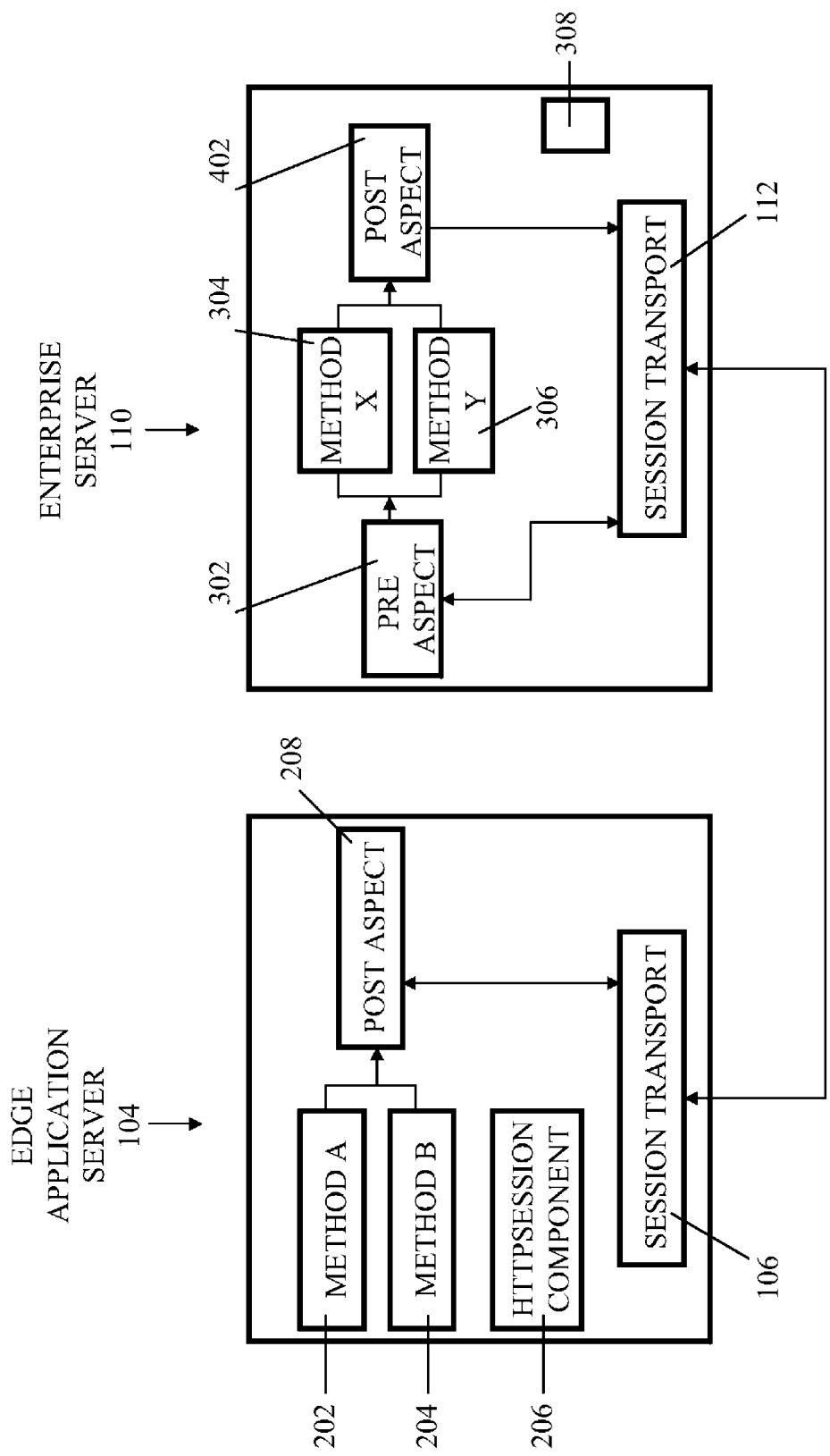
FIG. 4 depicts an edge application server and an enterprise server of the session data sharing system of FIG. 1 where changes to session data are transmitted to the edge application server according to one embodiment.

FIG. 4 depicts an edge application server 104 and an enterprise server 110 of the session data sharing system 100 of FIG. 1 where changes to session data are transmitted to the edge application server 104 according to one embodiment. The edge application server 104 may be substantially similar to that of FIGS. 2 and 3 and the discussion thereof will not be repeated here in the sake of brevity. The enterprise server 110 of the depicted embodiment includes a pre aspect component 302, one or methods 304, 306, a HttpSession component 308, a session transport component 106, and a post aspect component 402. The pre aspect component 302, one or methods 304, 306, HttpSession component 308, and session transport component 106 of FIG. 4 may be substantially similar to those of FIG. 3 and the discussion thereof will not be repeated here in the sake of brevity.

The post aspect component 402 may be created by the HttpSession component 308 as a modification to the code of methods 304, 306 identified as modifying session data by the HttpSession component 308. In the depicted embodiment, the post aspect component 402 may be created as a subsequent action to the execution of methods 304, 306 that executes after the methods 304, 306 execute. The post aspect component 402 may be used to save changes to session data to session transport 112 for ultimate transport to session transport component 106 and the edge application server 104. In one embodiment, the HTTP data (e.g., the IP address) may be stripped from the HTTP headers of the user request data to identify the edge instance (i.e., the edge application server 104) with which the user has been communicating so that the proper edge application server 104 may be contacted by session transport component 112. The post aspect component 402 allows for changes to session data at the enterprise server 110 to be pushed to the appropriate edge application server 104 so that it will be properly updated. When session transport 106 at the edge application server 104 receives the updated session data, the session data may be saved and the time of receipt recorded.

In an alternative embodiment, the user's request may be held up until any modified data is transmitted to the edge application server 104. This may help prevent confusion between different user sessions (with the edge application server 104 and enterprise server 110). This does, however, potentially slow down the user's interaction with the enterprise server 110. For this and other reasons, it may be beneficial to limit the number of modifications made to the session at the enterprise server 110.

Figure 5:
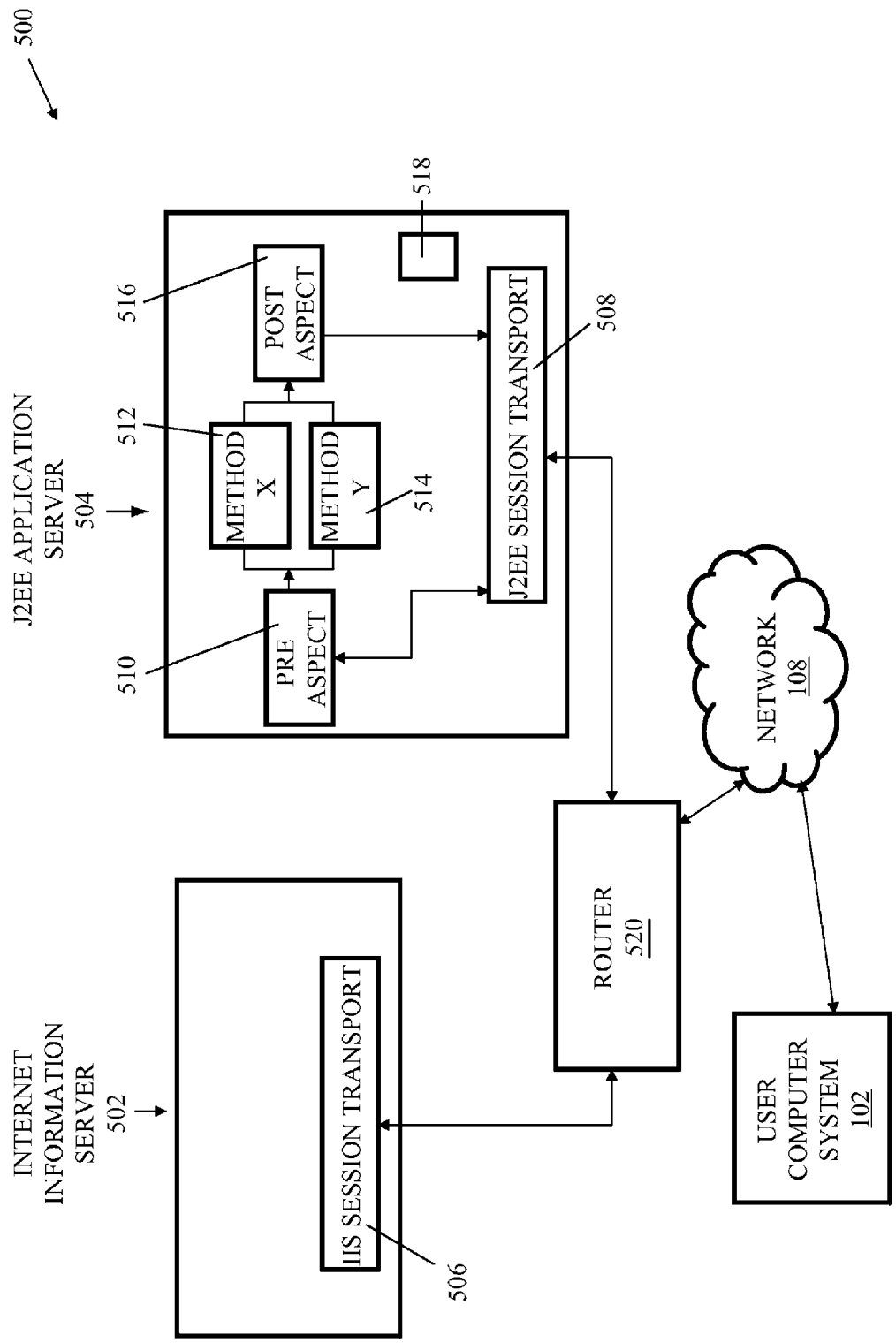
FIG. 5 depicts an Internet server and an application server of the session data sharing system according to an alternative embodiment.

FIG. 5 depicts an Internet server and an application server of the session data sharing system according to an alternative embodiment. Session data sharing system 500 includes both an Internet Information Server (IIS Server) 502 and a J2EE application server 504. Session data sharing system 500 may be useful for a website provider that is migrating from an IIS solution to an application server solution such as IBM's® WebSphere. In this embodiment, session data sharing system 500 would typically have a single sign-on (SSO)-type solution and router spraying that can direct the user to the appropriate application on the appropriate application tier. A user on a user computer system 102 accessing a network site hosted on the IIS server 502 and the J2EE application server 504 may access the servers via router 520 and network 108. Both of the IIS server 502 and the J2EE application server 504 have their own HTTP session state information that cannot natively be shared. However, since the website provider may be migrating applications they need to be able to share session state until the migration is complete and the IIS server 502 can be removed. The session data sharing system 500 of the depicted embodiment allows for session data from the IIS servers 502 to be shared with the J2EE application servers 504. Discussion of elements substantially similar to elements as described in relation to FIGS. 1-5 is left out in the interest of brevity.

The IIS server 502 may include an IIS session transport component 506. IIS session transport component 506 may perform many of the same functions as session transport component 106. In one embodiment, IIS session transport component 506 may include a module in the IIS webapp root location in order to be able to gain access to the session state of the IIS-based applications. Accordingly, high-level access to the IIS server 502 is required for the operation of IIS session transport component 506 of the session data sharing system 500.

The IIS server 502 and the J2EE application server 504 may communicate with user computer system 102 through a router 502 connected to network 108. The J2EE application server 504 of the depicted embodiment includes a pre aspect component 510, one or methods 512, 514, a HttpSession component 518, a J2EE session transport component 508, and a post aspect component 516. These components may be substantially similar to those of FIGS. 1-4 and the discussion thereof will not be repeated here in the sake of brevity.

Modifications to user session data in the IIS server 502 may be communicated to the J2EE application server 504 utilizing the IIS session transport component 506 and the J2EE session transport component 508. The HttpSession component 518 may be used to identify methods within the J2EE application server 504 that require updated session data and automatically instrument those methods. The pre aspect component 510 may be used to initiate the request to the IIS server 502 for updated session data for a user session, and once the session data is received, a session local to the J2EE application server 504 may be created. In many fashions, the principles of session data sharing system 100 may be applied to that of session data sharing system 500, with the IIS server 502 taking the role of the edge application server 104 and the J2EE application server 504 taking the role of the enterprise server 110. In the depicted embodiment, however, changes to session data at the J2EE application server 504 cannot be shared with the IIS server 502. Accordingly, changes to the J2EE session data should be minimized in the depicted embodiment.

Figure 6:
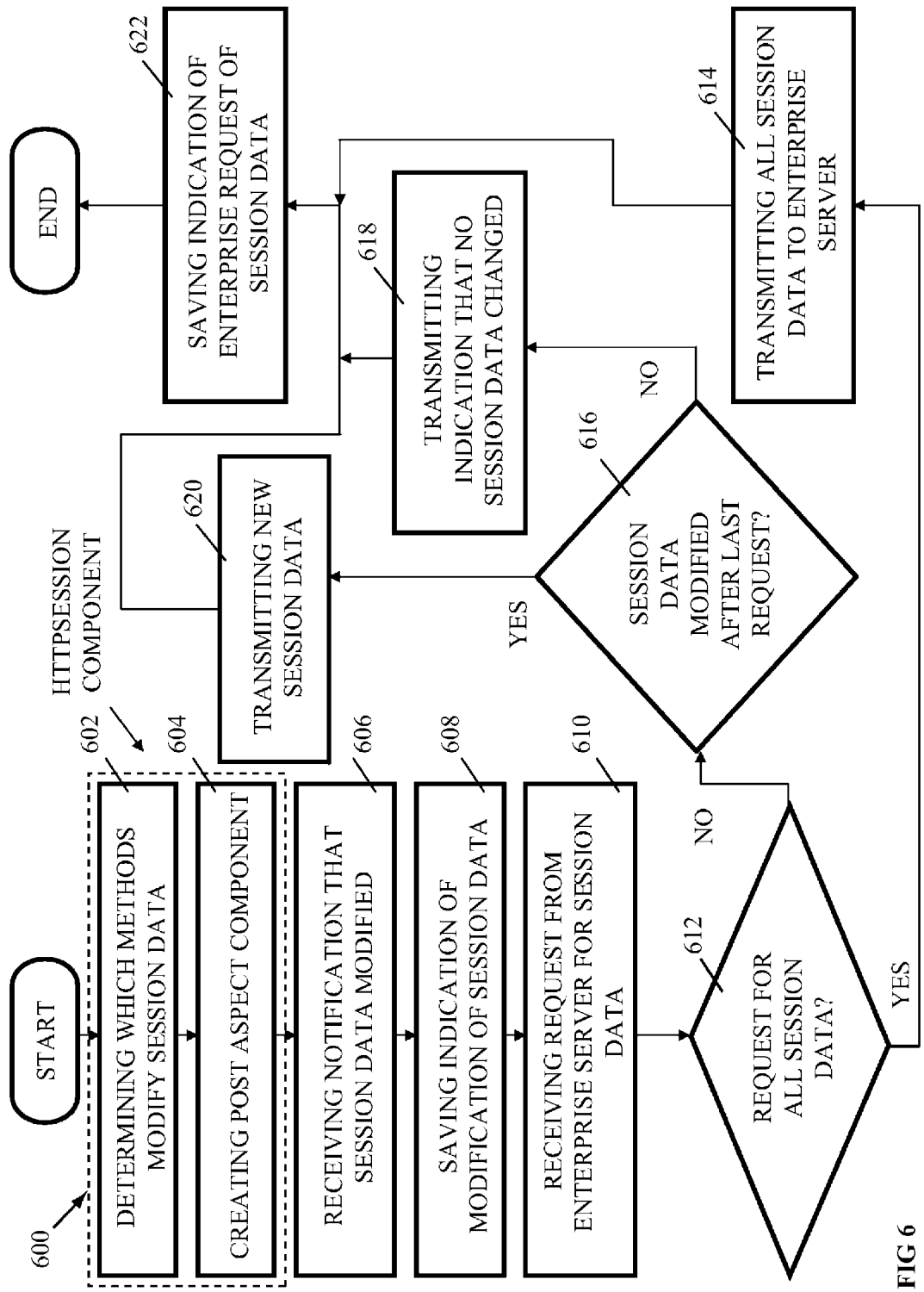
FIG. 6 depicts an example of a flow chart for transmitting session data to an enterprise server according to one embodiment.

FIG. 6 depicts an example of a flow chart for transmitting session data to an enterprise server 110 according to one embodiment. The method of flow chart 600 may be performed, in one embodiment, by components of an edge application server 104. Flow chart 600 begins with element 602, determining which methods 202, 204 modify session data. Flow chart continues to element 604, creating a post aspect component 208 for methods 202, 204, for which session data will be modified. Elements 602 and 604 may be performed by the HttpSession component 206 at any time, such as when methods 202, 204 are called.

Elements 606 through 622 may be performed by session transport component 106 in one embodiment. The method of flow chart 600 then continues to element 606, receiving notification that session data was modified. In this element, the session transport component 106 may receive notification from a post aspect component 208 that a method 202, 204 modified session data such as HttpSession. The method of flow chart 600 then continues to element 608, saving an indication of the modification of session data. In this element, any modifications to session data, the time of the modifications, or other data may be saved by the session transport component 106 in a database or cache. In one embodiment, the data may be saved in the format described in relation to FIG. 10. The method continues to element 610, receiving a request from the enterprise server 110 for updated session data. The request in this element may be received from the session transport component 112 of the enterprise server 110.

The method of flow chart 600 then continues to decision block 612, where it is determined whether the request for session data is for all session data or just session data since the last request. If the request is for all session data, the method continues to element 614, transmitting all the session data to the enterprise server 110. After the session data is transmitted, the method continues to element 622, saving an indication of the enterprise request for session data, after which the method terminates. The indication of the request may be saved in a table as described in relation to FIG. 10. If the request is for the updated session data, the method continues to decision block 616, determining whether the session data has been modified since the last request of the enterprise server 110. The determination may be made based on saved information regarding the last request from the enterprise server 110, the record of changes to session data stored at the session data component 106, and the current time.

If the session data has not been modified since the last request, the method continues to element 618, transmitting an indication to the enterprise server 110 that no session data has changed. The method then continues to element 622, saving an indication of the enterprise request of session data, after which the method terminates. If the session data has been modified since the last request, the method continues to element 620, transmitting new session data to the enterprise server 110. Afterwards, the method continues to element 622, saving an indication of the enterprise request of session data, after which the method terminates.

Figure 7:
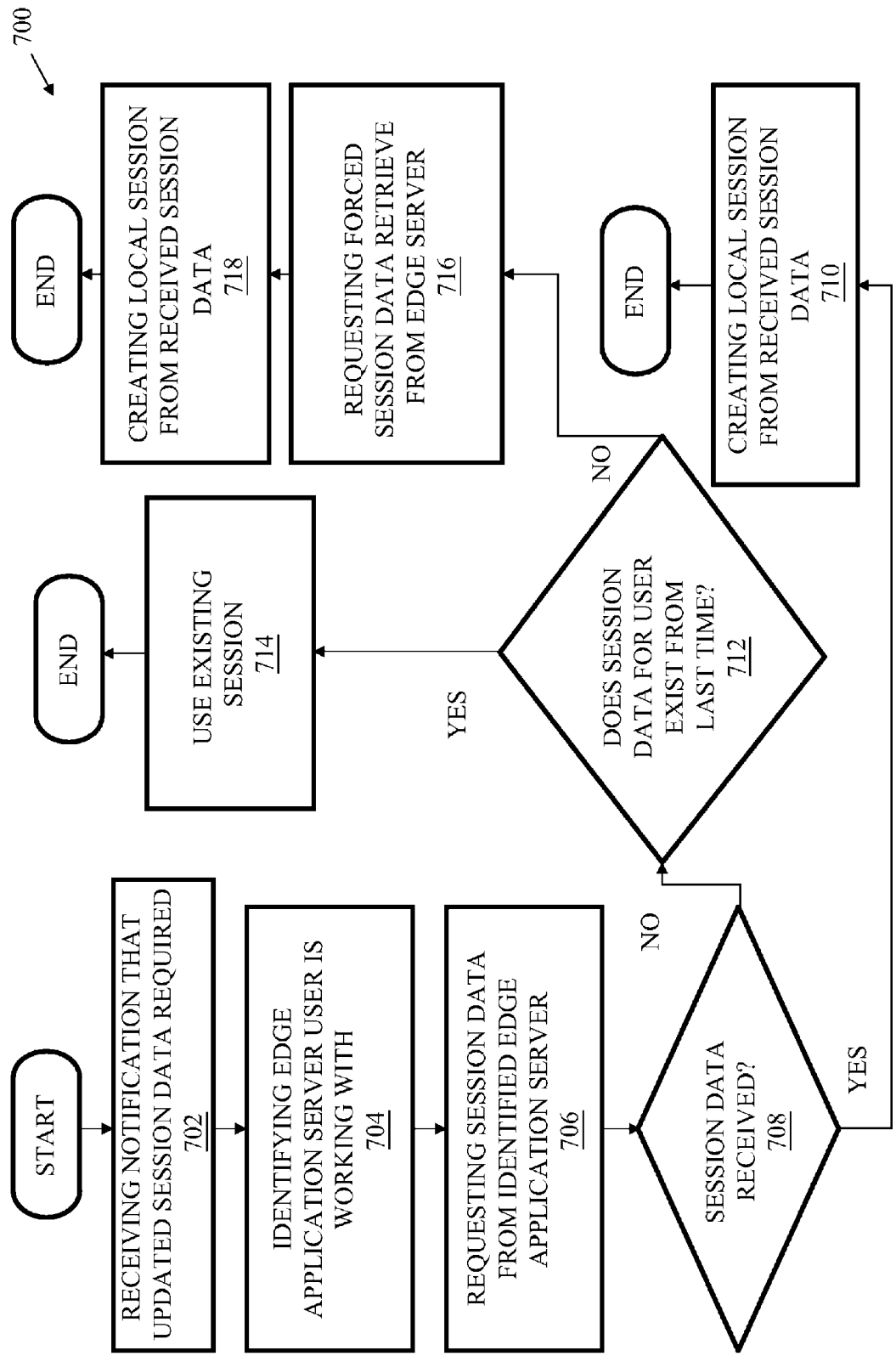
FIG. 7 depicts an example of a flow chart for requesting session data from an edge application server according to one embodiment.

FIG. 7 depicts an example of a flow chart for requesting session data from an edge application server 104 according to one embodiment. The method of flow chart 700 may be performed, in one embodiment, by the session transport component 112 of the enterprise server 110. Flow chart 700 begins with element 702, receiving notification that updated session data is required. In this element, the session transport component 112 may receive notification from a pre aspect component 302 that a method 304, 306 requires updated session data. The method of flow chart 700 then continues to element 704, identifying the edge application server 104 that user is currently working with. In one embodiment, the edge application server 104 may be identified by pulling IP information from HTTP headers of session data, a user request, or an older user session. The method continues to element 706, requesting session data from the identified edge application server 104. Element 706 may be accomplished by transmitting a request using the session transport component 112.

The method of flow chart 700 continues to decision block 708, determining if session data is received from the edge application server 104. If session data is received, the method continues to element 710, creating a local session from received session data, after which the method terminates. If only updated session data is received, the local session may be based on the earlier session data and the updated session data. If full session data is received, the local session may be based on the full session data. If no session data is received (such as after a period time), the method continues to decision block 712, determining if previous session data exists from the last time the user had a session with the enterprise server 110. If previous session data exists, the method continues to element 714, using the existing session, after which the method terminates. If previous session data does not exist, the method continues to element 716, requesting forced session data retrieval from the edge application server 104. When session data is received from the edge application server 104, the method continues to element 718, creating a local session based on the received session data, after which the method terminates.

Figure 8:
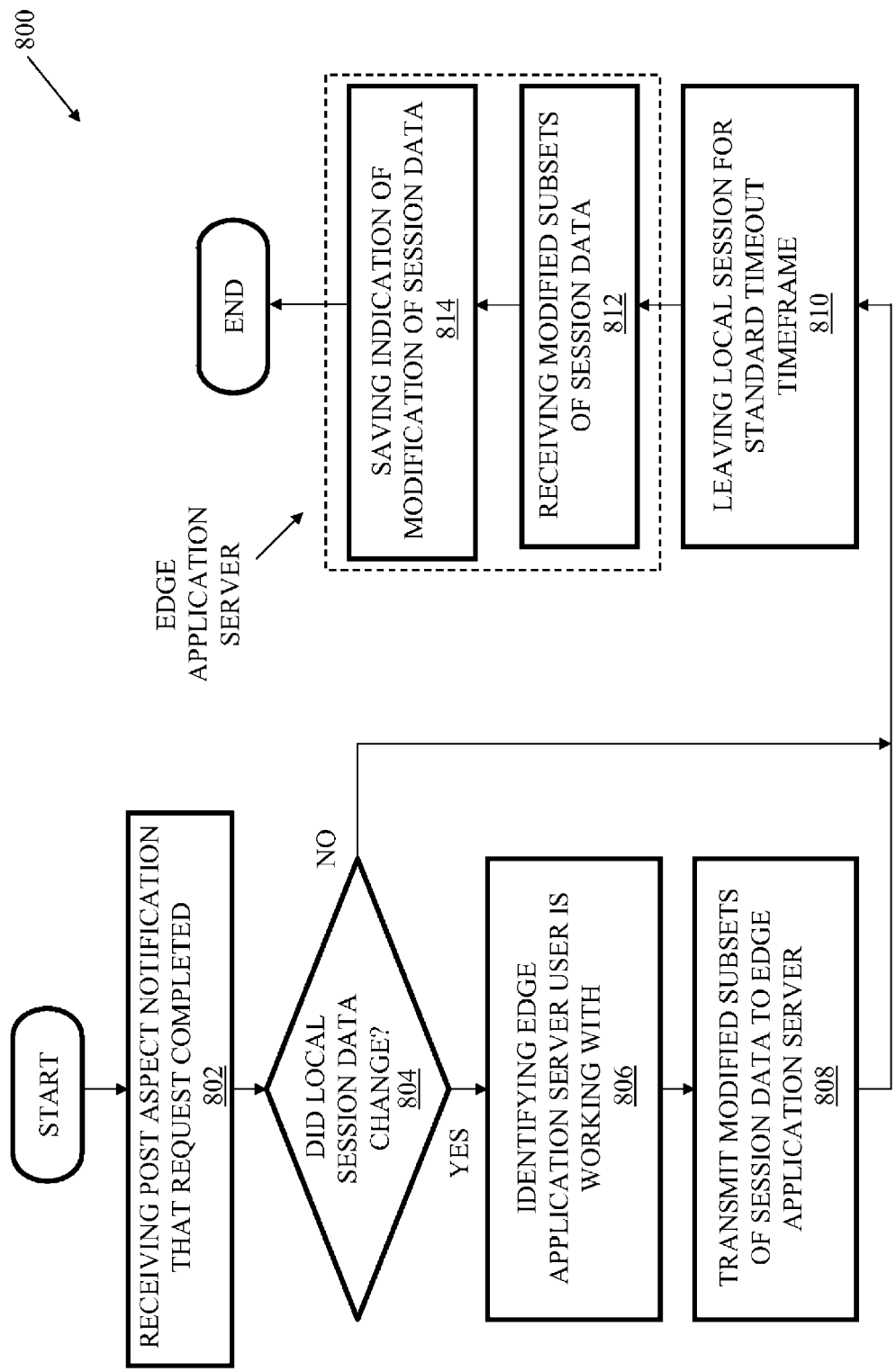
FIG. 8 depicts an example of a flow chart for updating session data on an edge application server according to one embodiment.

FIG. 8 depicts an example of a flow chart for updating session data on an edge application server 104 according to one embodiment. Elements of the method of flow chart 800 may be performed, in one embodiment, by the session transport component 112 of the enterprise server 110. Flow chart 800 begins with element 802, receiving notification from post aspect component 402 that the user request has been completed. In this element, the session transport component 112 may receive notification from a post aspect component 402 that a method 304, 306 has modified session data. The method of flow chart 800 then continues to decision block 804, determining if local session data (i.e., local to the enterprise server 110) has changed. If the local session data has changed, the method continues to element 806, identifying the edge application server 104 that user is currently working with. In one embodiment, the edge application server 104 may be identified by pulling IP information from HTTP headers of session data, a user request, or an older user session. The method then continues to element 808, transmitting the modified subsets of session data to the edge application server 104. After transmitting the modified session data in element 808, the method continues to element 810, leaving local session for standard timeout timeframe. In this element, the local session is kept alive in case more user requests arrive. The local session, however, may be terminated after the normal timeout timeframe has passed.

If the local session data did not change, the method continues from decision block 804 to element 810, leaving the local session for the standard timeout timeframe. The method then continues to element 812, receiving modified subsets of session data. Element 812 may be performed by the session component module 106 of the edge application server 104, where it receives the modified session data from session component module 112. The method then continues to element 814, saving an indication of the modification of session data, which may also be performed by session component module 106. After element 814, the method terminates.

In an alternative embodiment, the user's request is not completed until the edge application server 104 is notified of any changes in the session data at the enterprise server 110. In this embodiment, element 802 would be executed after the other elements of FIG. 8. This embodiment may slow the user's experience with the enterprise server 110 but helps to minimize the possibility of incorrect session data at the edge application server 104.

The methods of FIGS. 6, 7, and 8 may be applicable to the session data sharing system 500 of FIG. 5 with the IIS server 502 taking the role of the edge application server 104 and the J2EE application server 504 taking the role of the enterprise server 110. In one embodiment, however, the method of FIG. 8 would not be applicable to session data sharing system 500 as the IIS session transport component 506 may not receive changes to the session data at the J2EE application server 504, resulting in the inability to update the IIS server 502 with updated session data from the J2EE application server 504. One of ordinary skill in the art will recognize that many alternatives are possible for applying the methods of FIGS. 6, 7, and 8 to the session data sharing system 500.

Figure 9:
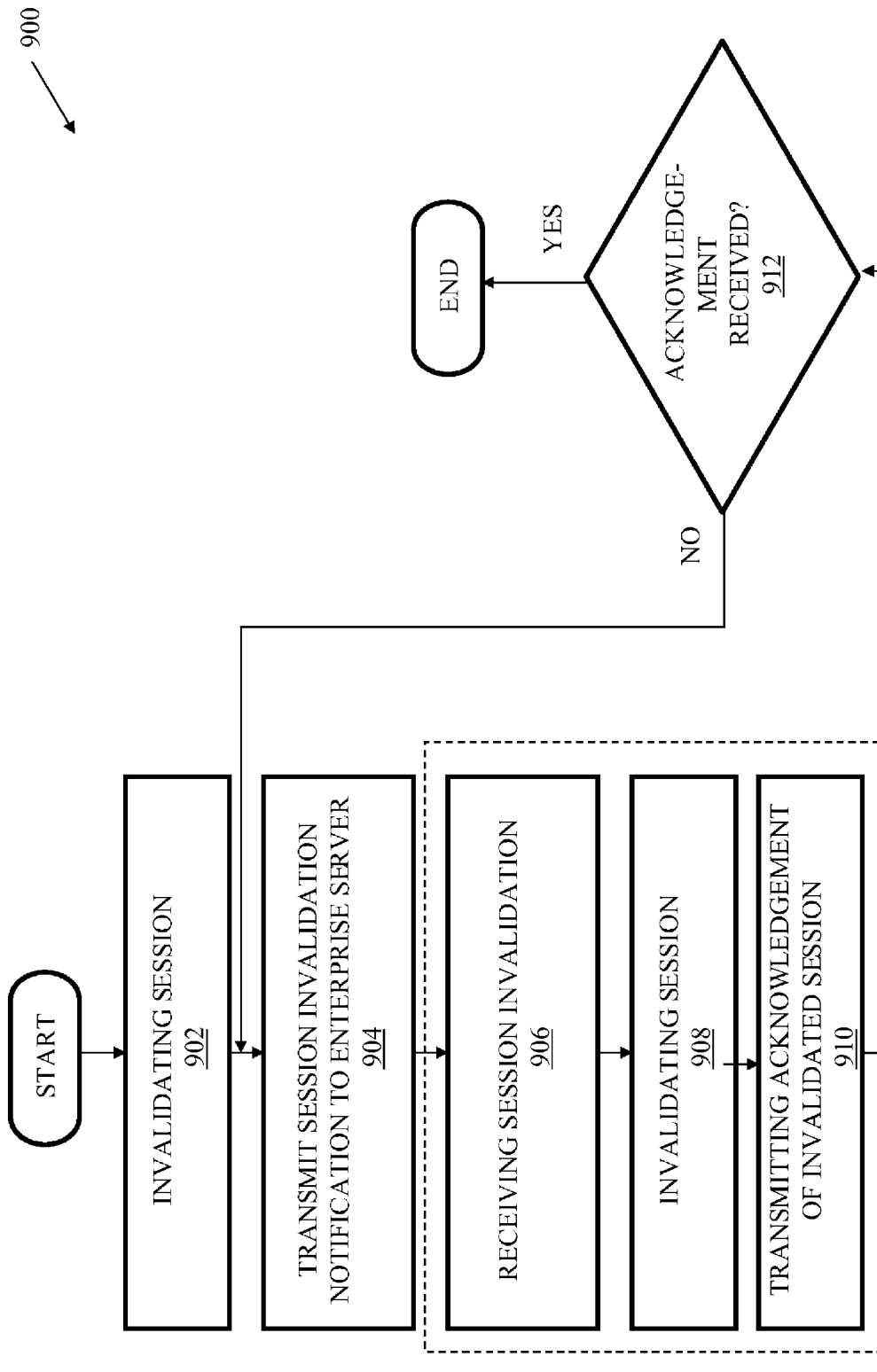
FIG. 9 depicts an example of a flow chart for invalidating a session according to one embodiment.

FIG. 9 depicts an example of a flow chart for invalidating a session according to one embodiment. Elements of the method of flow chart 900 may be performed, in one embodiment, by the session transport component 112 of the enterprise server 110 and the session transport component 106 of the edge application server 104. Flow chart 900 may be performed, in one embodiment, when a user logs out and it is desired to terminate the user's session for security reasons. Flow chart 900 begins with element 902, invalidating the session (i.e., the HttpSession) at the session transport component 106 of the edge application server 104. After element 902, the session transport component 106 may transmit a notification of the session invalidation to the enterprise server 110.

Elements 906, 908, and 910 may be performed by the session transport component 112 of the enterprise server 110 in one embodiment. In element 906, the session transport component 112 may receive the session invalidation from the edge application server 104. The method of flow chart 900 continues to element 908, invalidating the session, and to element 910, transmitting an acknowledgement of the invalidated session to the edge application server 104. After element 910, the method continues to decision block 912, determining whether an acknowledgement was received. Element 912 is performed at session transport component 106 of the edge application server 104 in one embodiment. If an acknowledgement is received (indicating that the enterprise server 110 invalidated the session), the method terminates. If no acknowledgement is received, the method returns to element 904 where a new notification may be transmitted to the enterprise server 110. In one embodiment, notifications may be sent to the enterprise server 110 until an acknowledgement is received. In another embodiment, notifications may only be sent a set number of times. Termination of the session at the enterprise server 110 assists in preventing hackers or other unauthorized persons from attempting to access a user's session data.

Session invalidation may be modified when applied to the session data sharing system 500 of FIG. 5. When an IIS server 502 abandons a session (e.g., when a user logs out), there is nothing that can be done to notify the J2EE application server 504. In this case, the J2EE application server 504 may simply timeout the user's session. Any activity that the user should attempt to continue on the J2EE server will not affect anything on the IIS server 502 as the user would no longer have their IIS session cookie.

Figure 10:
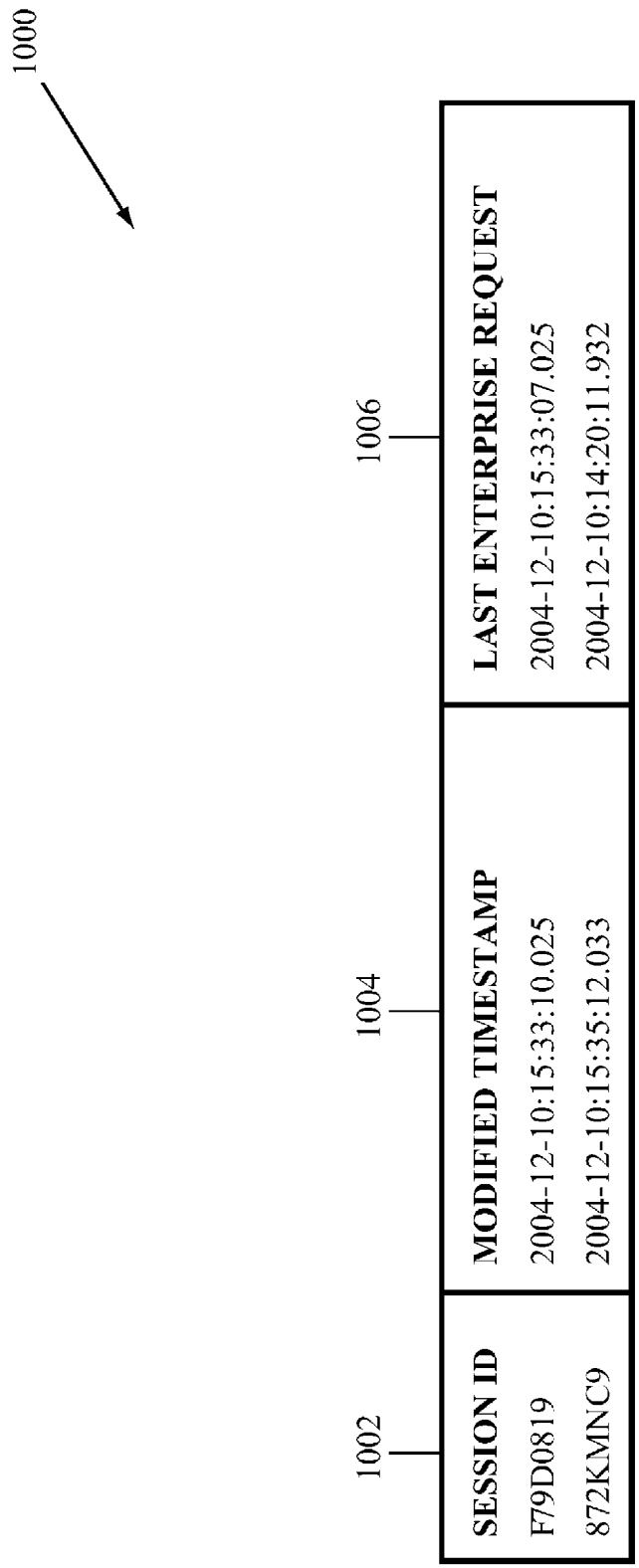
FIG. 10 depicts a representation of a session data table maintained by an edge application server according to one embodiment.

FIG. 10 depicts a representation of a session data table 1000 maintained by the session transport component 106 according to one embodiment. Session data table 1000 includes, in the depicted embodiment, columns for a session identifier 1002, a modification timestamp 1004, and enterprise requests 1006. Each row of session data table 1000 corresponds to different user session in the depicted embodiment, but a particular user session may be located on multiple rows in other embodiments. The configuration of session data table 1000 depicted in FIG. 10 is only one possible configuration of session data table 1000, and one skilled in the art will recognize that many alternative configurations are possible, including other types of information.

The session identifier column 1002 may hold an identifying number used by the edge application server 104 to identify different user sessions. The modification timestamp column 1004 may hold a record of the last time a session was modified. In an alternative embodiment, the modification timestamp column 1004 may include a record of multiple modifications to a session. Enterprise requests column 1006 may include a record of the last time the enterprise server 110 requested updated session data. Other alternatives for session data table 1000 are possible.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for sharing session data on a network. It is understood that the form of the invention shown and described in the detailed description and the drawings are to be taken merely as examples. It is intended that the following claims be interpreted broadly to embrace all the variations of the example embodiments disclosed.

What is claimed is:

1. A data processing system for sharing session data on a network, the system comprising:
an application server to provide at least part of an application to a user on the network, the user having an established session on the application server that has associated session data and as part of which the application server performs one or more methods for the user, the application server comprising:
a session transport component to record changes to the session data and to receive requests from enterprise servers for updated session data for the session between the application server and the user, the requests being subsequent to previous requests from a particular enterprise server, the updated session data comprising any changes to session data since a previous request;
wherein the session transport component transmits updated session data from the application server to the enterprise server; and
a post aspect component of an aspect-oriented programming system that is created based on changes to data of an application server session resulting from performance of one or more methods; and
an enterprise server in communication with the application server to provide at least part of an application to a user on the network, the enterprise server comprising:
a pre aspect component of an aspect-oriented programming system to determine that a method of the enterprise server will need updated session data from the application server session with the user and to determine that the application server has a current session with the user;
a session transport component of the enterprise server in communication with the session transport component of the application server to request updated user session data from the application server and to receive updated session data from the application server; and
wherein the enterprise server creates a local session with the user based on the received updated session data for the session between the user and the application server.

2. The system of claim 1, further comprising an HttpSession component located on the application server for determining which methods will modify the session data.

3. The system of claim 1, further comprising an HttpSession component located on the enterprise server for determining which methods will modify the session data and for determining which methods will require updated session data.

4. The system of claim 1, wherein the session data comprises HttpSession data.

5. The system of claim 1, wherein the network is the Internet.

6. The system of claim 1, wherein the application server is an edge application server.

7. The system of claim 1, wherein the application server is an Internet Information Server.

8. The system of claim 1, wherein the enterprise server is a J2EE application server.

9. A machine-accessible storage medium of a storage device containing instructions effective, when executing in a data processing system, to cause said data processing system to perform operations wherein the machine-accessible storage medium is not a signal, the operations comprising:
performing, by a particular application server, one or more methods for a user as part of an application server session with the user;
creating, by the particular application server, a post aspect component of an aspect-oriented programming system based on changes to data of the application server session resulting from performance of the one or more methods;
at an enterprise server, determining by a pre aspect component of an aspect-oriented programming system that a method of the enterprise server will need updated session data from an application server session with the user;
determining, by the enterprise server, that the particular application server has a current session with the user;
requesting, by the enterprise server, new session data from the particular application server;
at the particular application server, receiving a request from the enterprise server for the updated session data for a session between the user and the particular application server, the request being subsequent to a previous request from the enterprise server, the updated session data comprising any changes to the session data since the previous request;
transmitting the updated session data from the particular application server to the enterprise server;
receiving at the enterprise server the updated session data; and
creating a local session at the enterprise server based on the updated session data for the session between the user and the particular application server.

10. The machine-accessible storage medium of claim 9, further comprising at the enterprise server, identifying a network address for the application server.

11. The machine-accessible storage medium of claim 9, further comprising forcing session data retrieval from the application server.

12. The machine-accessible storage medium of claim 9, further comprising:
determining that session data has been modified at the enterprise server; and
transmitting an indication of the modified session data from the enterprise server to the application server.

13. The machine-accessible storage medium of claim 9, further comprising at the application server, determining whether the session data was modified since the previous request.

14. The machine-accessible storage medium of claim 9, further comprising at the application server, saving an indication of the request for updated session data.

15. The machine-accessible storage medium of claim 9, further comprising at the enterprise server, receiving new session data from the application server.

* * * * *